United States Patent [19]
Desjardins

[11] Patent Number: 5,906,470
[45] Date of Patent: May 25, 1999

[54] ARCH TRAILER FOR MOTORCYCLE TRANSPORT AND CAMPING

[76] Inventor: Lucien Desjardins, 5035 SW. 90th Ave., Cooper City, Fla. 33328-3622

[21] Appl. No.: 08/859,505

[22] Filed: May 20, 1997

[51] Int. Cl.⁶ ........................................................ B60P 1/02
[52] U.S. Cl. ............................ 414/495; 280/720; 296/181
[58] Field of Search ..................................... 414/495, 917; 280/718, 720; 296/181

[56] References Cited

U.S. PATENT DOCUMENTS

| | | | |
|---|---|---|---|
| 2,337,073 | 12/1943 | Townsend | 280/718 X |
| 2,788,224 | 4/1957 | Ramun et al. | 280/718 |
| 3,442,409 | 5/1969 | Larson | 414/495 |
| 3,744,839 | 7/1973 | Stoneburner | 296/181 X |
| 4,005,784 | 2/1977 | Wilson | 414/495 X |
| 4,035,015 | 7/1977 | Smith | 296/181 |
| 4,077,642 | 3/1978 | Clark | 280/43.2 |
| 4,154,352 | 5/1979 | Fowler | 414/495 |
| 4,372,572 | 2/1983 | Verschage | 280/423 B |
| 4,637,770 | 1/1987 | Swadell | 414/495 |
| 4,673,328 | 6/1987 | Shiels | 414/471 |
| 4,752,177 | 6/1988 | Zenna | 414/495 |
| 4,932,830 | 6/1990 | Woodburn | 414/495 |
| 5,035,462 | 7/1991 | Page et al. | 296/181 |
| 5,288,197 | 2/1994 | Harris | 414/495 |
| 5,468,115 | 11/1995 | Alvis | 414/495 X |
| 5,527,138 | 6/1996 | Flores et al. | 414/495 X |
| 5,536,131 | 7/1996 | Behr | 414/495 |

FOREIGN PATENT DOCUMENTS

| | | | |
|---|---|---|---|
| 1461657 | 2/1989 | U.S.S.R. | 414/495 |
| 2190349 | 11/1987 | United Kingdom | 414/495 |
| 8808385 | 11/1988 | WIPO | 414/495 |

*Primary Examiner*—David A. Bucci
*Attorney, Agent, or Firm*—Frank L. Kubler

[57] ABSTRACT

A trailer for transporting a cargo vehicle such as a motorcycle in tow behind a towing vehicle includes a perimeter frame with a frame perimeter structure having a towing vehicle connection mechanism, and including trailer supporting wheels, the plane of the frame perimeter structure being oriented substantially parallel with the ground when the vehicle connection mechanism is connected to the towing vehicle; a cargo vehicle support bed positioned substantially within the perimeter frame; and a line and pulley elevation mechanism for lowering the bed substantially perpendicular to the ground to load and unload the cargo vehicle and for elevating the bed substantially perpendicular to the ground for cargo vehicle transport, so that the plane of the bed always remains substantially parallel with the plane of the perimeter frame. The line and pulley elevation mechanism includes lines connected to the bed at points substantially lateral to the center of gravity of the bed when loaded with a cargo vehicle for bed balance during bed lowering and elevation. The frame perimeter structure includes a forward cross structure and two parallel and spaced apart side rail structures integrally joined to and extending rearwardly from the forward cross structure.

25 Claims, 8 Drawing Sheets

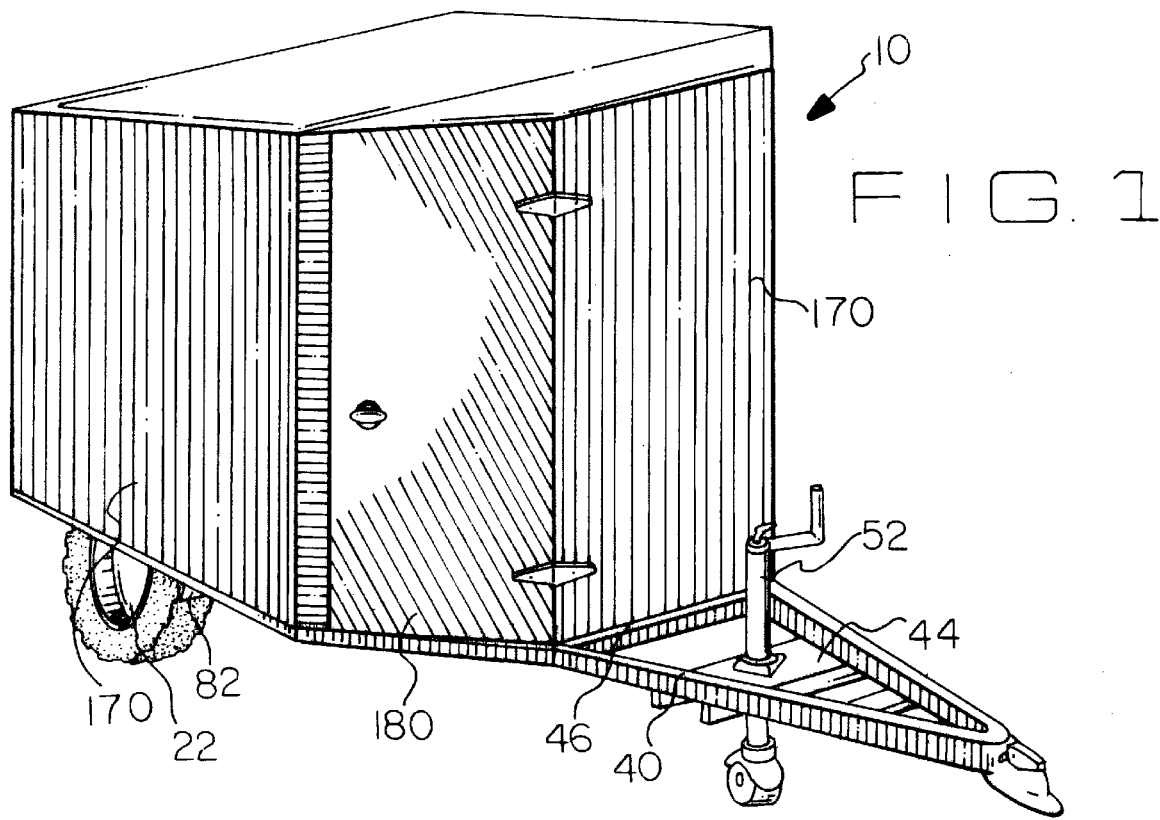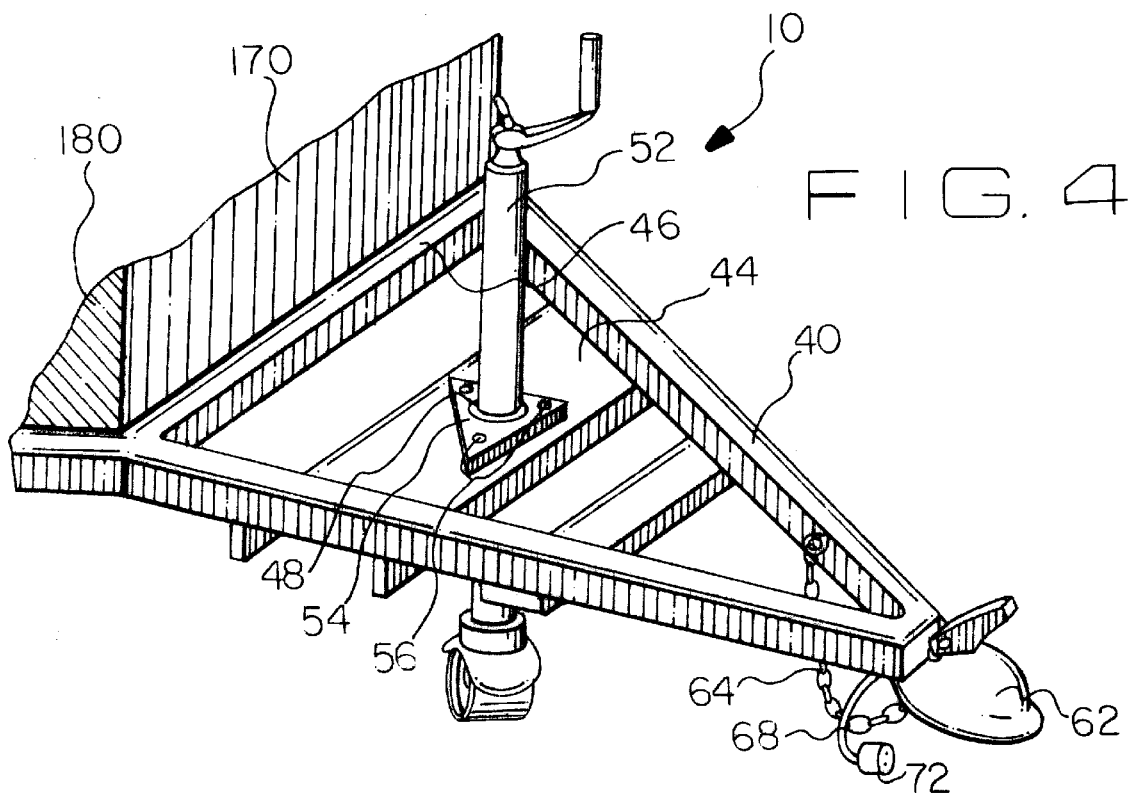

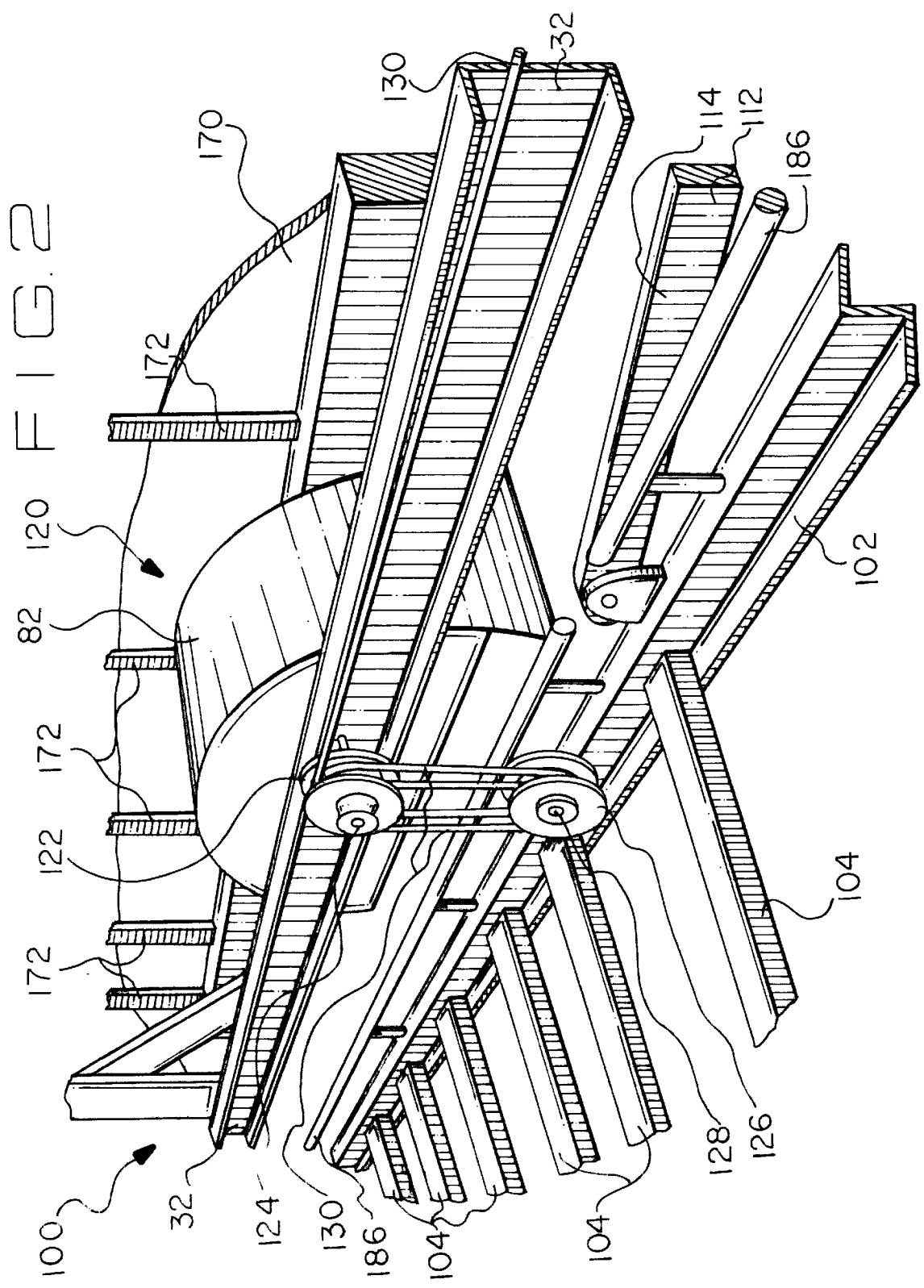

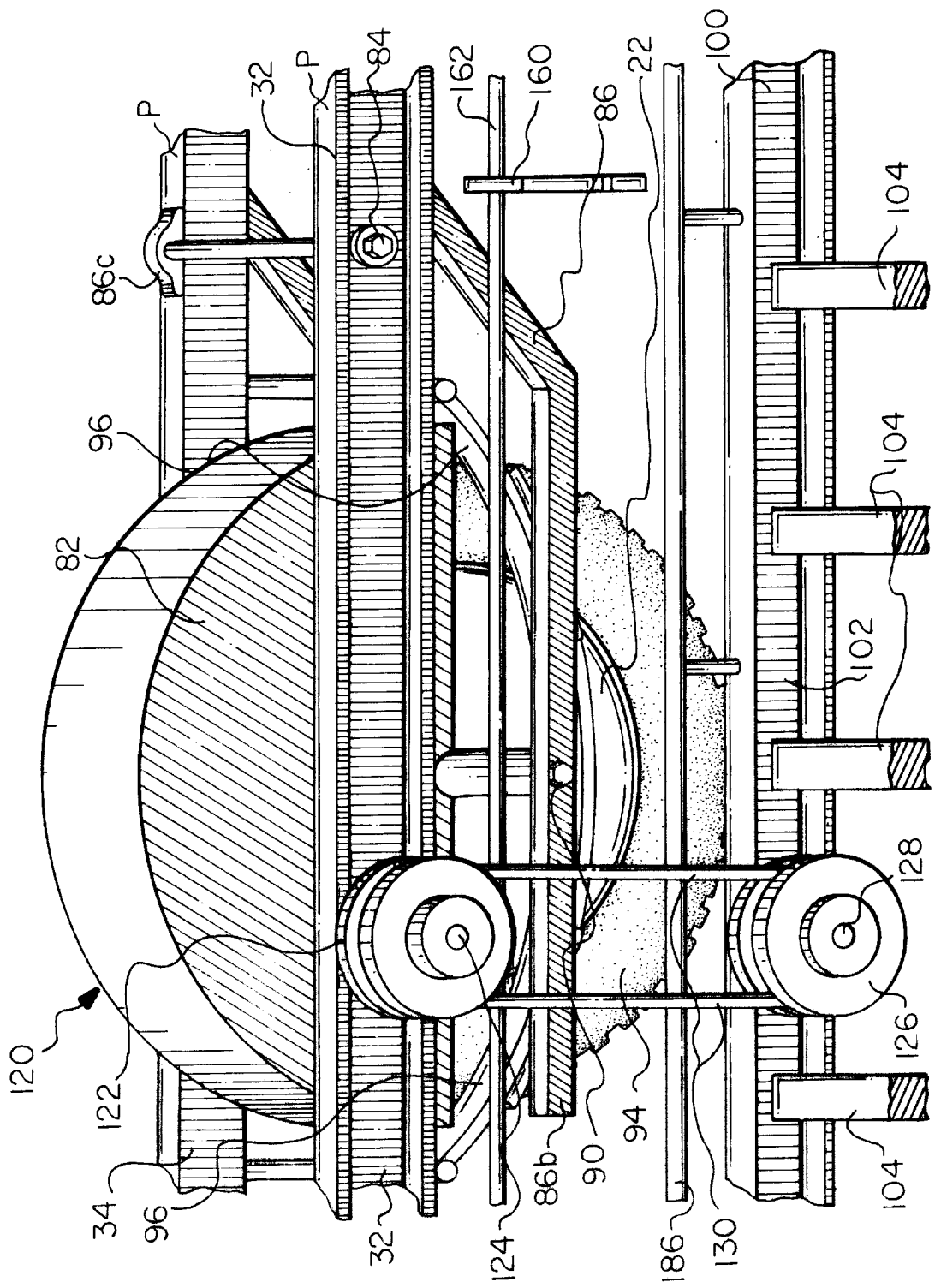

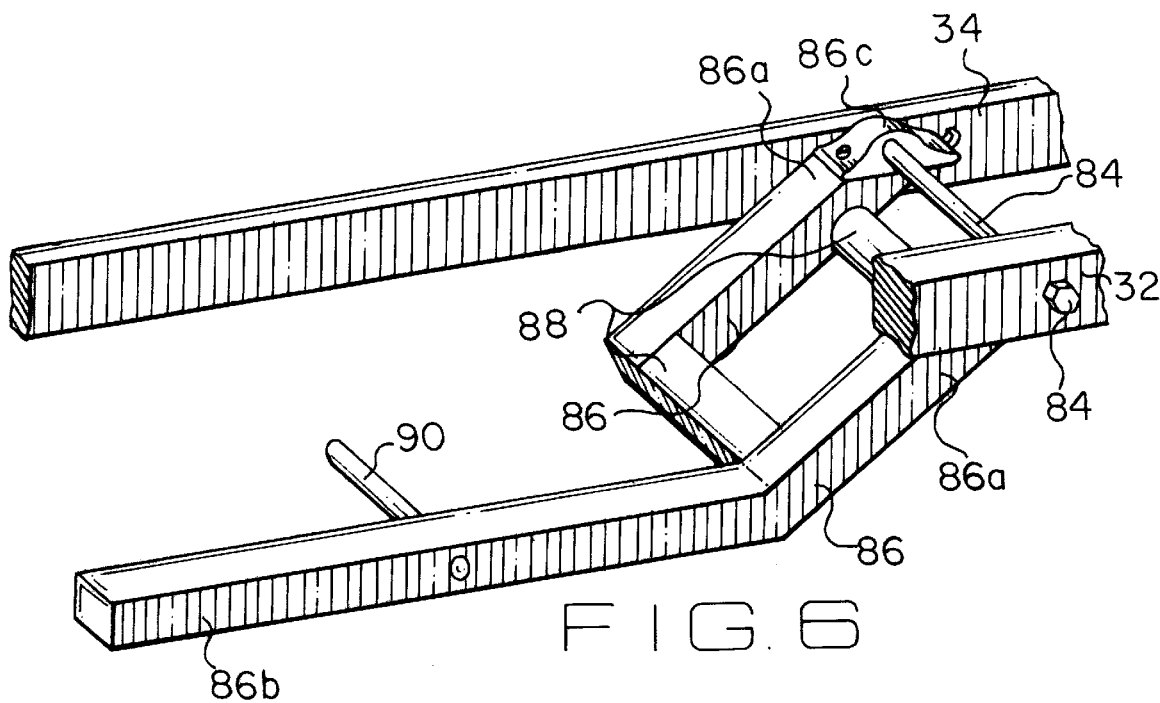
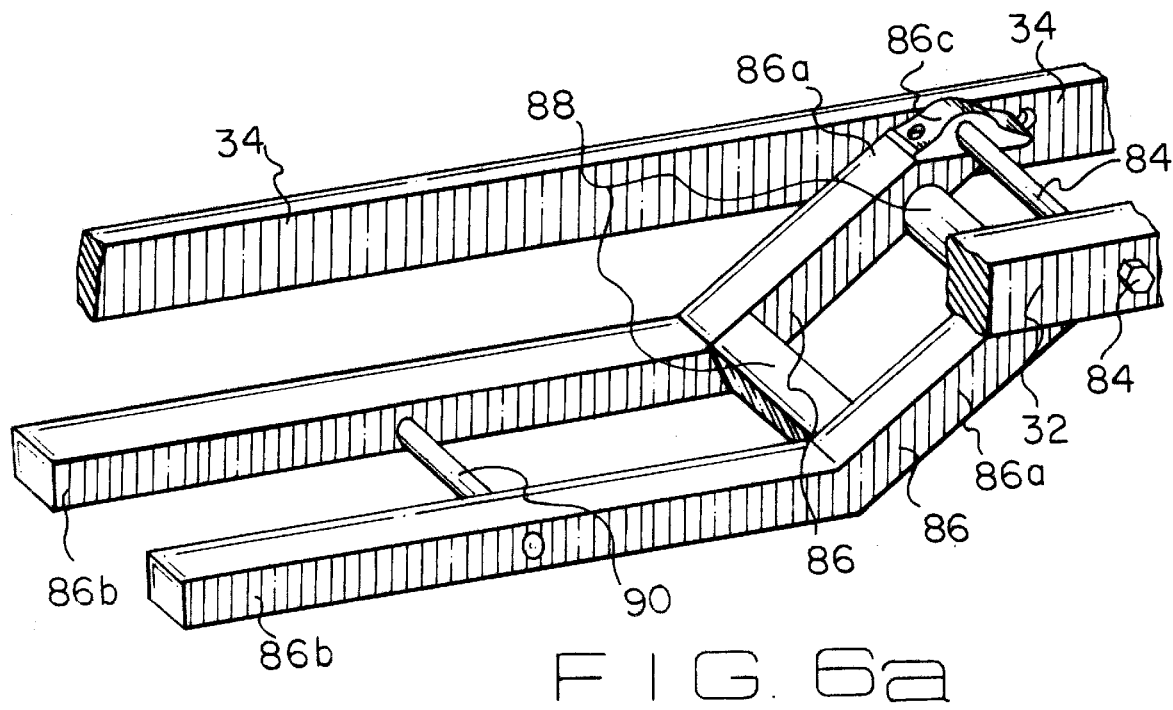

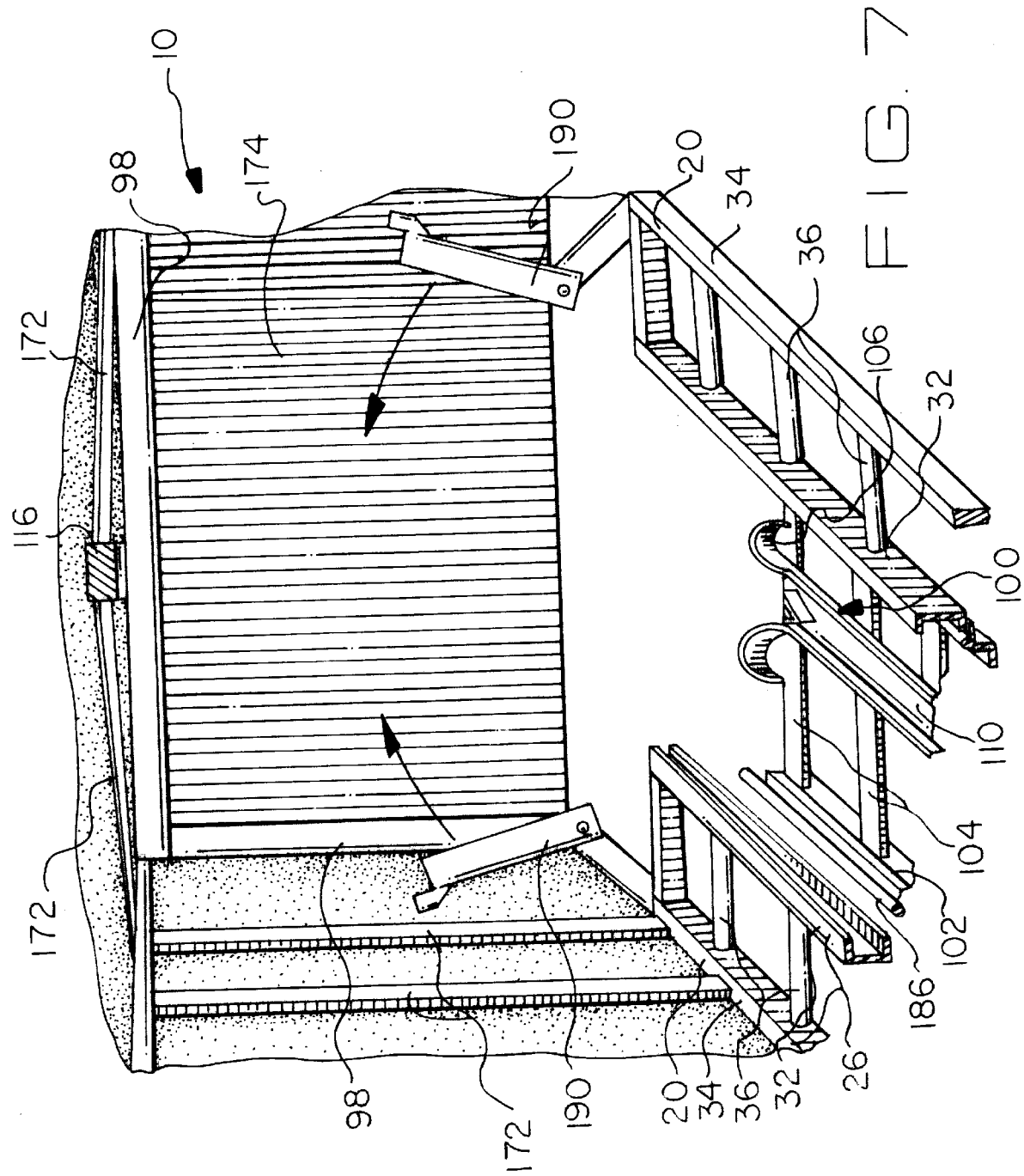

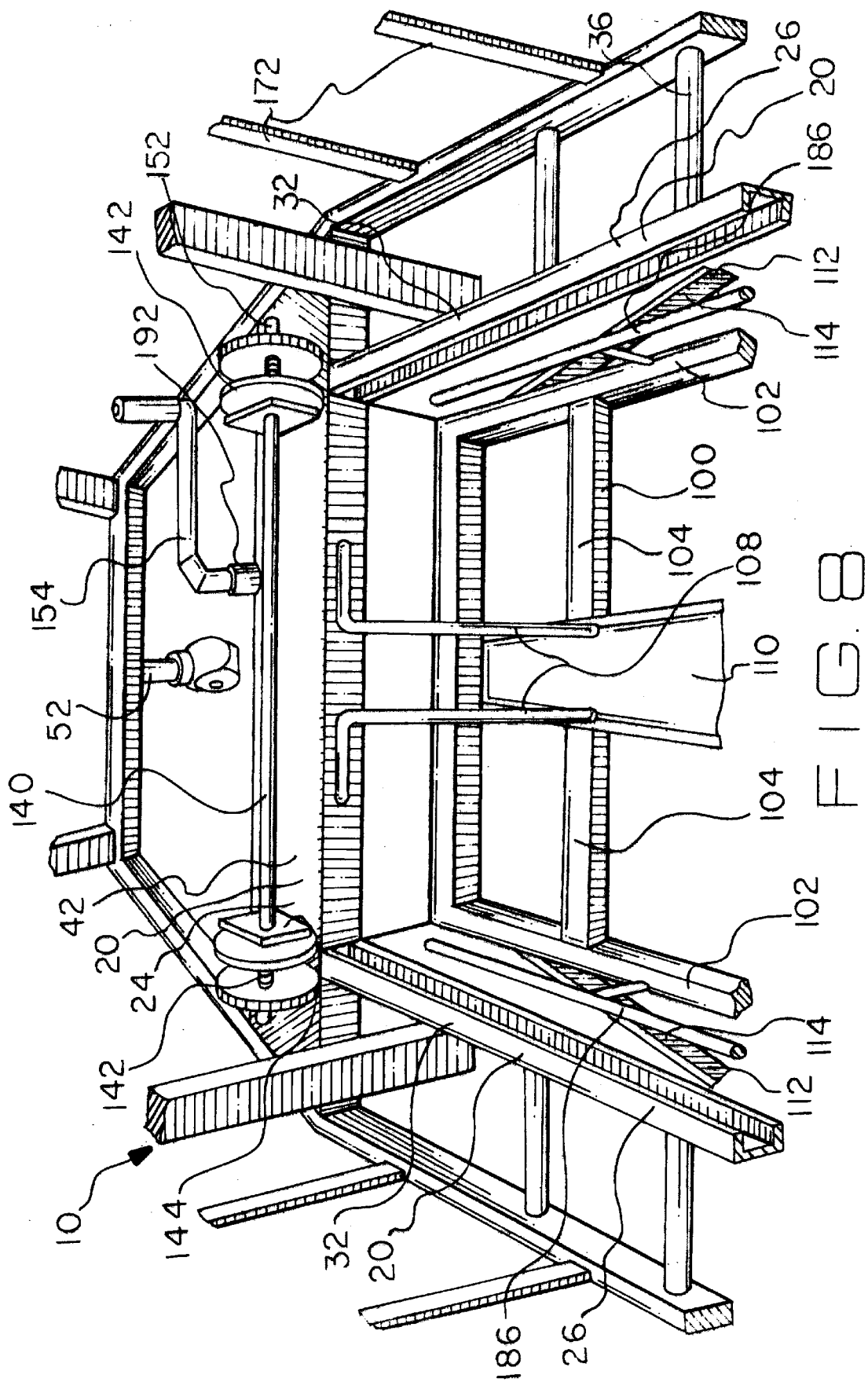

ARCH TRAILER FOR MOTORCYCLE TRANSPORT AND CAMPING

BACKGROUND OF THE INVENTION

1. Field of the Invention

The present invention relates generally to the field of trailers drawn by motor vehicles. More specifically the present invention relates to a trailer for transporting a vehicle such as a motorcycle, the trailer including a perimeter frame supported by trailer wheels and a motorcycle support bed mounted within the perimeter frame on a line and pulley elevation mechanism. The line and pulley elevation mechanism lowers the bed to load and unload the motorcycle and elevates the bed for motorcycle transport, such that the plane of the bed always remains substantially parallel with the perimeter frame and the ground. Lines from the line and pulley elevation mechanism preferably connect to the bed at points directly lateral to the center of gravity of the bed when loaded with a conventional motorcycle for balance during bed lowering and elevation.

2. Description of the Prior Art

There has long been a need to transport motorcycles by means other than driving them. As a result it has become a relatively common and hazardous practice to attempt to load motorcycles onto a conventional truck bed or equipment trailer. This is accomplished by pushing or riding the motorcycle up a ramp of some sort propped against the bed or trailer. Pushing a relatively large motorcycle up a ramp can be difficult or impossible for one person, and riding it up the ramp can be very dangerous. Should the motorcycle stall part way up the ramp, for example, there may not be adequate footholds to brace it against falling off the ramp and onto the rider.

Various trailers have been designed for carrying motorcycles and other vehicles. One such prior trailer is that of Zenna, U.S. Pat. No. 4,752,177, issued on Jun. 21, 1983 for a motorcycle trailer apparatus. Zenna includes a U-shaped outer frame with two parallel and spaced apart side portions and a forward cross-member interconnecting the side portions. Each side portion is fitted with a trailer wheel and tire and an upright hydraulic cylinder assembly. A motorcycle wheel receiving channel extends longitudinally midway between the frame side portions, and channel arms extend and join to a corresponding hydraulic cylinder assembly. The cylinder assemblies lower the wheel receiving channel within the outer frame to ground level to receive a motorcycle, and then raise the channel for trailer towing. A problem with Zenna is that the hydraulic cylinder assemblies make the trailer prohibitively expensive.

Behr, U.S. Pat. No. 5,536,131, issued on Jul. 16, 1996, teaches a utility trailer with level cargo support when lowered to and elevated from the ground. Behr includes a U-shaped outer frame and a generally planar bed within the outer frame, and a trailer hitch shaft extending forwardly from the outer frame. The outer frame and bed are interconnected on each side of the bed by forward and rearward pivot links. One end of each pivot link is rotatably fastened to a side of the bed and the other end is rotatably fastened to the outer frame through a torsion creating mechanism. A pulley and cable assembly is mounted to the forward end of the outer frame and the cable is connected to the forward end of the bed for raising and lowering the bed. A problem with Behr is that the bed loaded with cargo initially must be dragged over the ground before the bed rises. Another problem is that the bed and cargo must not only be lifted the distance required to clear the ground, but also moved substantially forward because of the upright orientation of the pivoting linkages, so that additional energy is required to generate bed and cargo momentum in a forward direction.

Shiels, U.S. Pat. No. 4,673,328, issued on Jun. 16, 1987, discloses a lift/tilt-bed trailer. Shiels includes a structure similar to that of Behr except that the pivot links are channel-shaped tracks and the bed has channel wheels which ride within the link tracks. A pulley is connected to a forwardly extending trailer hitch shaft and the cable extends generally horizontally back to the forward edge of the bed to raise the bed by rolling the bed wheels within the pivot link tracks. As a result of this construction, the bed can be raised and lowered in a level orientation, or the front only can be raised to tilt the bed into a ramp orientation. A problem with Shiels is that the bed, made heavy by loading with the cargo, must be initially dragged over the ground before it can rise. Another problem is that the bed and cargo must not only be lifted the distance required to clear the ground, but also moved substantially forward with the pivoting linkages, so that additional energy is required to generate forward bed and cargo momentum.

Fowler, U.S. Pat. No. 4,154,352, issued on May 15, 1979, reveals another motorcycle trailer. Fowler includes a trailer frame equipped to receive a motorcycle and having trailer supporting wheel assemblies. The wheel assemblies each including a fulcrum and linkage structure to pivot the wheels downwardly so that the trailer can roll on them and upwardly to lower the trailer frame to ground level for motorcycle loading and unloading. Wheel pivoting is accomplished by inserting a lever arm into a socket in each wheel assembly and applying lateral pressure to the arm. A problem with Fowler is that the user must lift not only the motorcycle but also the entire trailer frame during trailer loading and unloading.

Clark, U.S. Pat. No. 4,077,642, issued on Mar. 7, 1978, discloses a movable bed trailer. Clark includes a U-shaped frame mounted on a pair of oppositely disposed wheels and a bed mounted on double linkages within the frame. The bed is raised and lowered with a drive mechanism secured between the forward ends of the frame and bed. The bed remains in a substantially horizontal position during raising and lowering. A problem with Clark is that the bed loaded with cargo initially must be dragged over the ground before it can rise. Another problem is that the bed and cargo must not only be lifted the distance required to clear the ground, but also moved substantially forward with the pivoting linkages, so that additional energy is required to generate forward bed and cargo momentum.

Other related art includes Verschage, U.S. Pat. No. 4,372,572, issued on Feb. 8, 1983, for a tandem axle trailer with a hydraulic lift bed. The inclusion of a hydraulic system makes the trailer relatively expensive. The art also includes Harris, U.S. Pat. No. 5,288,197, issued on Feb. 22, 1994, for an equipment trailer; and Page, et al., U.S. Pat. No. 5,035,462, issued Jul. 30, 1991, for a utility vehicle chassis having a vertically adjustable bed. Harris and Page, et al., both teach truck beds within a truck body which are lowered between the rear wheels of the truck. A problem is that no provision is made for cargo vehicle transport with an already owned truck or car.

It is thus an object of the present invention to provide a trailer for transporting a cargo vehicle such as a motorcycle in tow behind a towing vehicle.

It is another object of the present invention to provide such a trailer having a bed within a perimeter frame which is lowered in a level orientation with a cable and pulley mechanism to ground level for loading and unloading the cargo vehicle and which is raised in a level orientation with the mechanism for towing.

It is still another object of the present invention to provide such a trailer in which the bed is raised without significant sliding of the bed over the ground.

It is finally an object of the present invention to provide such a trailer which requires no hydraulic bed elevation mechanisms and is otherwise highly economical to manufacture.

SUMMARY OF THE INVENTION

The present invention accomplishes the above-stated objectives, as well as others, as may be determined by a fair reading and interpretation of the entire specification.

A trailer is provided for transporting a cargo vehicle in tow behind a towing vehicle, the trailer including a perimeter frame with a frame perimeter structure having a towing vehicle connection mechanism, and including trailer supporting wheels, the plane of the frame perimeter structure being oriented substantially parallel with the ground when the vehicle connection mechanism is connected to the towing vehicle; a cargo vehicle support bed positioned substantially within the perimeter frame; and a line and pulley elevation mechanism for lowering the bed substantially perpendicular to the ground to load and unload the cargo vehicle and for elevating the bed substantially perpendicular to the ground for cargo vehicle transport, so that the plane of the bed always remains substantially parallel with the plane of the perimeter frame.

The cargo vehicle is preferably a motorcycle. The line and pulley elevation mechanism preferably includes lines connected to the bed at points substantially lateral to the center of gravity of the bed when loaded with a cargo vehicle for bed balance during bed lowering and elevation. The frame perimeter structure preferably includes a forward cross structure and two parallel and spaced apart side rail structures integrally joined to and extending rearwardly from the forward cross structure. Each side rail structure preferably includes substantially mutually parallel inner and outer rail members spaced laterally apart from each other and interconnected by at least one cross-strut. The cross structure preferably includes a cross-beam fastened substantially perpendicularly to the forward ends of both sets of the inner and outer rail members. The trailer optionally additionally includes an A-shaped nose frame connected to and extending forwardly from the cross-beam, and including an A cross-link having a vertical opening and a conventional trailer jack extending through the vertical opening and fastened to the A cross-link; and the towing vehicle connection mechanism preferably includes a conventional trailer hitch cup structure fastened to the forward-most portion of the A-shaped nose frame. The towing vehicle preferably includes towing vehicle tail and brake light circuitry, the trailer additionally including trailer tail and brake lights secured to the rear of the trailer, and trailer tail and brake light wiring extending forwardly from the trailer tail and brake lights and having an automobile wiring connection plug for connection to the towing vehicle tail and brake light circuitry. Each side rail structure preferably includes a trailer supporting wheel mounting structure.

Each trailer supporting wheel mounting structure preferably includes a wheel mount pivot bolt fitted through bolt ports in and fastened between corresponding inner and outer rail members; two spaced apart wheel mount arms having arm pivot ends which pivotally engage the pivot bolt and extend downwardly and rearwardly to wheel mount ends; a wheel axle extending between and through the arm wheel mount ends onto which at least one trailer supporting wheel is mounted; and a spring extending between the wheel axle and the frame perimeter structure for both dissipating and transmitting trailer supporting wheel ground impact energy to the frame perimeter structure. The trailer preferably additionally includes a wheel fender fitted and fastened between the inner and outer rail members of each side rail structure. Each trailer supporting wheel includes a conventional trailer wheel rotatably mounted on the wheel axle and an inflated tire fitted around the trailer wheel. The spring is preferably a leaf spring having a leaf spring arch with a leaf spring middle portion and having leaf spring ends, the leaf spring being oriented so that the leaf spring arch opens upwardly from the ground and the spring middle portion is connected to the wheel axle and the leaf spring ends are pivotally joined to spring mounting structures connected to the frame perimeter structure.

The trailer preferably additionally includes an inverted substantially U-shaped brace member structurally joined to the rearmost ends of the side rail structures for structurally interconnecting and holding the side rail structures substantially fixed relative to each other, the brace member being sized to readily pass the cargo vehicle when the bed is lowered during cargo vehicle loading and unloading. The lowermost ends of the U-shaped brace member are optionally connected to the rearmost ends of each outer rail member.

The bed preferably includes a substantially rectangular bed outer frame portion; a series of substantially parallel and laterally extending bed cross-members fastened within the outer frame portion. The trailer preferably additionally includes a pivoting interconnection slat extending between and rotatably fastened at one slat end to a corresponding the inner rail member and at the other slat end to the outer frame portion; so that the interconnection slat pivots downwardly when the bed is lowered and is sized to angle sharply relative to the bed outer frame portion when the bed is in a fully lowered position, and so that the bed makes only a slight longitudinal swing during bed lowering and elevating. The trailer preferably additionally includes a motorcycle wheel guide channel including an upwardly opening U-shaped channel member laterally centered on top of the bed cross-members, extending from the front to the rear of the bed across the bed cross-members, and fastened to the bed.

The line and pulley elevation mechanism preferably includes a rail double pulley rotatably mounted to the interior side of each inner rail member; a bed double pulley rotatably mounted to the bed below each the rail double pulley; flexible line interconnecting the rail and bed double pulleys on each side of the bed; a forward pulley axle having pulley axle ends and a line gathering pulley at each pulley axle end and extending over and being rotatably mounted in pulley axle brackets connected to and protruding upwardly from the forward cross structure, the forward pulley axle having axle rotation mechanism; so that each line extends between each pair of rail and bed double pulleys and then forwardly from each rail double pulley where it is gathered around a corresponding line gathering pulley, and so that rotating the pulley axle with the axle rotation mechanism in one rotational direction simultaneously gathers both of the lines around the two corresponding line gathering pulleys and thereby raises the bed, and rotating the pulley axle in the other rotational direction simultaneously unwinds both of the lines from around the two line gathering pulleys and thereby lowers the bed.

The trailer preferably additionally includes a bed latching mechanism for removably locking the bed in an elevated position. The bed latching mechanism preferably includes a hook member fastened to a hook rod rotatably mounted within brackets extending from each of the side rail structure, to swing underneath the bed outer frame portion, so that the bed can be lowered to rest upon the hooks and the weight of the bed holds the hook members and hook rod against rotation.

The trailer preferably additionally includes a series of inverted U-shaped ribs of spanning and extending upwardly from the side rail structures; a sheet metal outer shell fastened to the ribs; and a door opening at the rearward portion of the shell fitted with at least one hinged door for passing the cargo vehicle during loading and unloading.

The trailer preferably additionally includes a tie-down bar extending along and secured to each of the side rail structures within the trailer for tying mounting straps which lash the cargo vehicle in place during towing.

The trailer preferably still additionally includes a gate pivotally connected to each vertical side of the inverted U-shaped brace member, for pivoting downwardly into a substantially level position behind a loaded the cargo vehicle for keeping the cargo vehicle from rolling out of the trailer during towing.

BRIEF DESCRIPTION OF THE DRAWINGS

Various other objects, advantages, and features of the invention will become apparent to those skilled in the art from the following discussion taken in conjunction with the following drawings, in which:

FIG. 1 is a perspective view of the inventive trailer secured behind a towing vehicle.

FIG. 2 is close-up perspective view the rail and bed double pulley structure on one side of the bed, with broken away segments to of the bed, side rail structure and shell side wall.

FIG. 4 is a broken away perspective side view of the A-shaped nose frame, fitted with the jack and trailer hitch cup structure, and showing the brake and tail light towing vehicle circuit connection plug.

FIG. 5 is a perspective view of the preferred trailer supporting wheel assembly, shown within a broken away segment of a side rail structure and beside a corresponding section of the bed.

FIG. 6 is a view as in FIG. 5 showing only the wheel mount arms mounted between the inner and outer rail members. FIG. 6a shows the two wheel mount arm option.

FIG. 7 is a perspective of the rear interior portion of the trailer as seen from inside the trailer, illustrating the inverted U-shaped brace member and the cargo vehicle retaining gates.

FIG. 8 is a perspective of the front interior portion of the trailer as seen from inside the trailer, illustrating the pulley axle and the axle crank handle removed from the axle and mounted on an adjacent peg until needed.

DETAILED DESCRIPTION OF THE PREFERRED EMBODIMENTS

Figure 3:
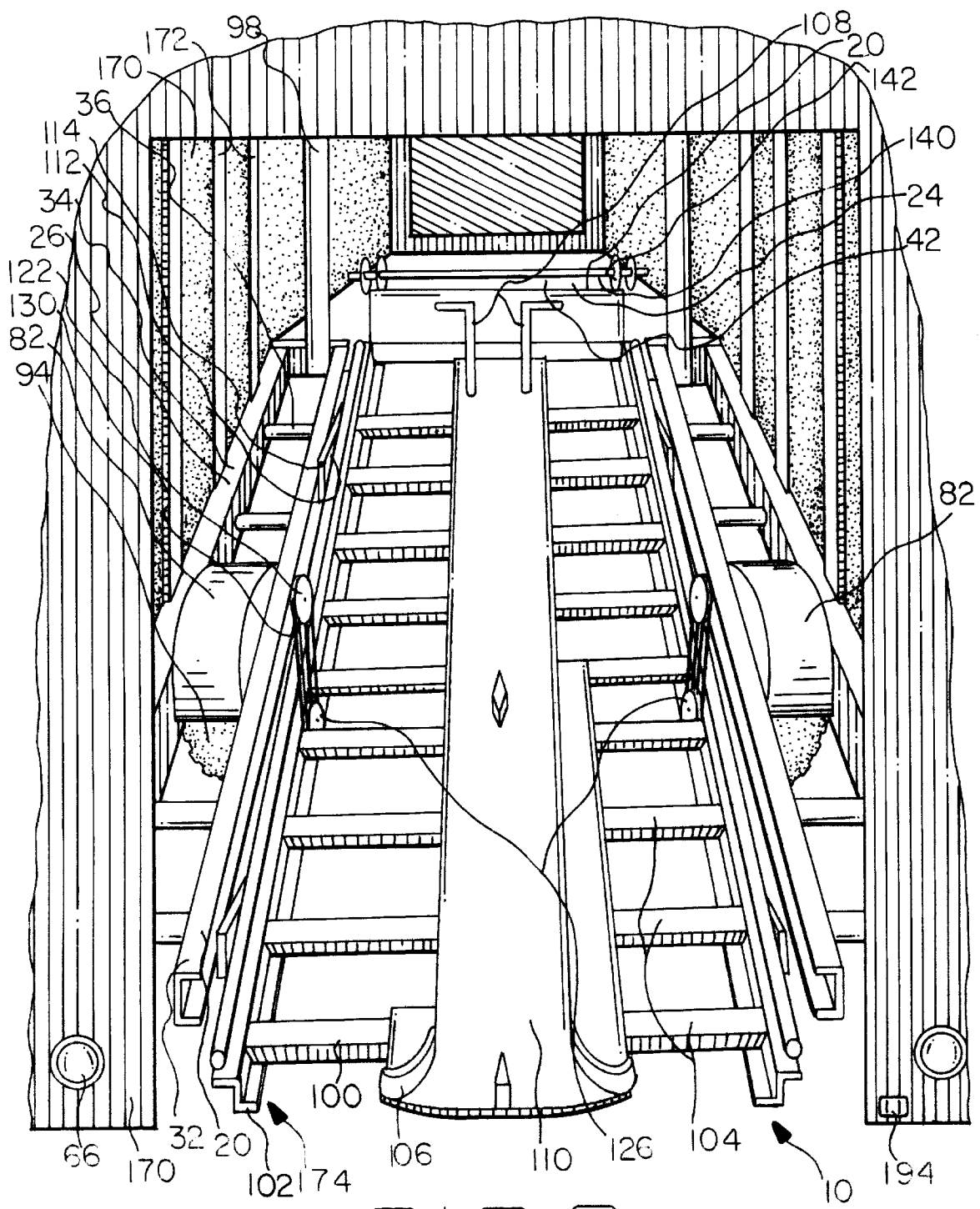
FIG. 3 is a rear perspective view looking into the trailer through the opening in the shell rear wall, with the doors removed, revealing the bed, side rail structures on either side of the bed, the cross beam and the side and forward shell walls.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various Figures are designated by the same reference numerals.

First Preferred Embodiment

Referring to FIGS. 1–10, a trailer 10 for transporting a vehicle such as a motorcycle is disclosed. Trailer 10 includes a perimeter frame 20 supported by trailer wheels 22 and substantially parallel with the ground, and a motorcycle support bed 100 mounted within perimeter frame 20 on a line and pulley elevation mechanism 120. See FIGS. 2 and 3. Line and pulley elevation mechanism 120 lowers the bed 100 to rest on the ground for loading and unloading the motorcycle and elevates the bed 100 for transporting the motorcycle, such that the plane of the bed 100 always remains substantially parallel with perimeter frame 20 and the ground. Flexible lines 130 extending from line and pulley mechanism 120 preferably connect to the bed 100 at points directly lateral to the center of gravity of the bed 100 when loaded with a conventional motorcycle for balance during bed 100 lowering and elevation.

Perimeter frame 20 includes a forward cross structure 24 and two parallel and spaced apart side rail structures 26 integrally joined to and extending rearwardly from forward cross structure 26. Each side rail structure 26 preferably includes longitudinal inner and outer rail members 32 and 34, respectively, spaced laterally apart and interconnected by welded cross-struts 36. See FIG. 3.

Cross structure 24 preferably includes a heavy cross-beam 42 welded perpendicularly to the forward ends of both sets of inner and outer rail members 32 and 34. An A-shaped nose frame 40 is welded to and extends forwardly from cross-beam 42, and includes two A cross-links 44 and 46. The forward-most A-cross link 42 includes a vertical opening 48 and a conventional trailer jack 52 extends through opening 48. Trailer jack 52 has a radial flange 54 which is anchored to cross-link 46 with fasteners 56. See FIGS. 1 and 4. A conventional trailer hitch cup structure 62 is fastened to the forward-most point of the A-shaped nose frame 40, and towing vehicle connection chains 64 are provided. The trailer 10 is equipped with conventional tail and brake lights 66 and brake light wiring 68 extending forwardly to an automobile wiring connection plug 72, for full compliance with highway safety laws.

Each side rail structure 26 includes a wheel mounting structure having a wheel fender 82 fitted between and welded to the inner and outer rail members 32 and 34. See FIG. 5. A wheel mount pivot bolt 84 is fitted through bolt ports in and fastened to, the inner and outer rail members 32 and 34. One wheel mount arm 86, and optionally two spaced apart wheel mount arms 86, have arm pivot ends 86a which pivotally engage the pivot bolt 84 through a bearing structure 86c and extend downwardly and rearwardly to wheel mount ends 86b. Bearing structure 86c is connected to arms with bolts (not shown) passing through a plate P welded to the pivot ends 86a having wide plate openings so that arms can be oriented in a range of positions to permit wheel 22 alignment. See FIGS. 6 and 6a, respectively. Where only one wheel mount arm 86 is provided, a supporting box structure is provided including arm cross-struts 88. See FIG. 6. The one arm 86 construction is preferred because it permits rapid and direct access to the wheel 22 for rapid changing of a flat. A wheel axle 90 extends between and through the arm wheel mount end 86b or ends 86b, and a conventional trailer wheel 22 and inflated tire 94 are rotatably mounted on axle 90. A leaf spring 96 is provided and is oriented so that its arch opens upwardly, the spring 96 middle portion is connected to wheel axle 90 and the spring 96 ends are pivotally joined to spring mounting struts extending between the inner and outer rail members 32 and 34.

The rearmost ends of rail structures 26 are structurally interconnected and held substantially fixed relative to each other by an inverted U-shaped brace member 98. See FIG. 7. Each lowermost end of U-shaped brace member 98 is connected to the rearmost end of each outer rail member 34. U-shaped brace member 98 is sized so that a motorcycle can pass easily through it during loading and unloading. A second U-shaped brace member 98 preferably interconnects the forward end of rail structures 26. The two brace members 98 are preferably interconnected by a central overhead beam 116 which can be used as a hoist for heavy items such as engines, upon removal of the bed 100. Bed 100 is preferably made up of a rectangular bed outer frame portion 102, a series of parallel and laterally extending bed cross-members 104 welded to outer frame portion 102. Bed 100 is preferably removable by disconnecting line and pulley elevation mechanism 120 and interconnection slats 112, which are described in the pages which follow. A motorcycle wheel guide channel 110 in the form of an upwardly opening U-shaped channel member is laterally centered and extends from front to rear across the bed cross-members 104, and is welded to cross-members 104. See FIG. 3. The side walls 106 at the rearward end of the wheel guide channel 110 are preferably outwardly flared to receive motorcycle wheels at a number of loading angles relative to channel 110. Angled front wheel retaining rods 108 are preferably provided at the forward end of guide channel 110. A pivoting interconnection slat 112 preferably extends between and is rotatably bolted at one end to the inner rail member 32 and at the other end to bed outer frame portion 102. Each interconnection slat 112 pivots downwardly when bed 100 is lowered and is of sufficient length relative to the full lowering distance of the bed that it angles sharply relative to the bed outer frame portion 102 when even bed 100 is fully lowered. Slat 112 swings to no more than a thirty-five degree angle with bed outer frame 102 when bed 100 is fully lowered to the ground, and preferably makes less than a fifteen degree angle with outer frame 102. As a result bed 100 makes only a negligible longitudinal swing during lowering and elevating, and therefore has negligible drag over the ground during bed 100 elevation, greatly minimizing friction resistance. Two pivoting slats 112 may be provided on each side of bed 100.

An alternative bed 100 guide structure is contemplated, in which bed upright members are fastened to bed outer frame 102 and slide within vertical guide tracks or tubes secured to perimeter frame 20. The most important and a key inventive feature here, once again, is that the elevation movement guide structure 114 for bed 100 permit elevation of bed 100 substantially perpendicular to the ground with minimal or zero bed 100 drag on the ground.

Line and pulley elevation mechanism 120 preferably includes a rail double pulley 122 rotatably mounted with a horizontal rail pulley bolt 124 to the interior side of each inner rail member 32 adjacent the combined bed 100 and motorcycle center of gravity. See FIG. 2. A bed double pulley 126 is rotatably mounted on a horizontal bed pulley bolt 128 directly below each rail pulley bolt 124. Corresponding rail and bed double pulleys 122 and 126, respectively, are interconnected with a flexible line 130, preferably a steel cable, to function and operate equivalently to a block and tackle device. A forward pulley axle 140 having a line gathering pulley 142 at each end extends over and parallel to the frame forward cross structure 24, and is rotatably mounted in pulley axle brackets 144 extending upwardly from the forward cross-beam 42. See FIG. 8. Pulley 140 axle has a crank receiving axle end 152 with a rectangular cross-section and a crank handle 154 having a socket with a correspondingly sized rectangular cross-section which removably fits over the crank receiving axle end 152.

Line 130 extends forwardly from each rail double pulley 122 where it is gathered around the line gathering pulley 142 located on the same side of the trailer 10. Rotating pulley axle 140 with axle crank handle 154 in one rotational direction simultaneously gathers the lines 130 on both sides of bed 100 around the two corresponding gathering pulleys 142 and thereby raises bed 100. Rotating pulley axle 140 in the other rotational direction simultaneously unwinds the lines 130 from around the two gathering pulleys 142 and thereby lowers bed 100.

Figure 9:
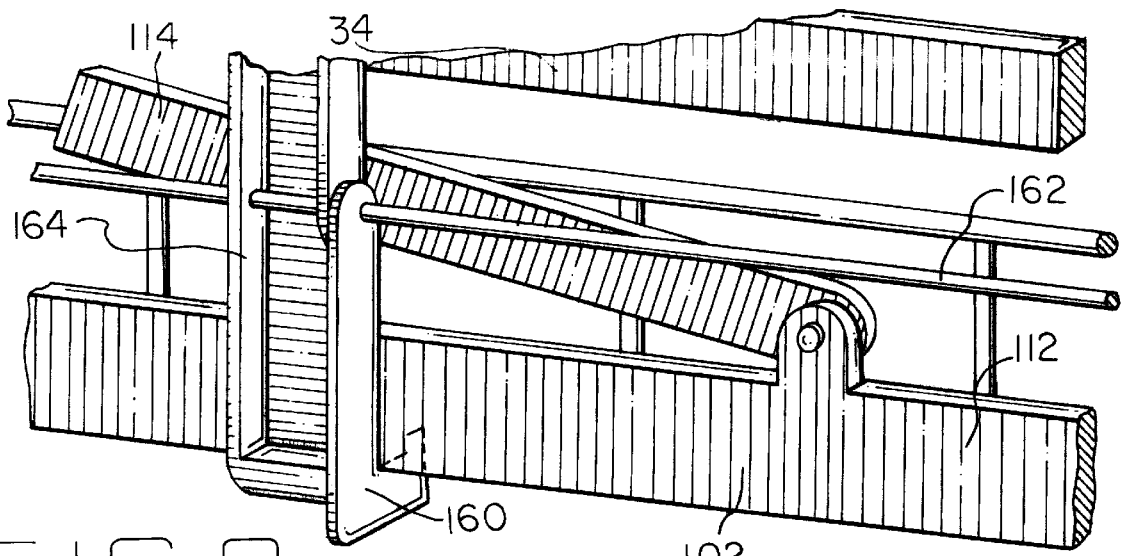
FIG. 9 is a perspective outside view of a segment of the bed outer frame and of a hook and hook rod, with the hook pivoted underneath and engaging the bed outer frame to secure the bed in an elevated position.
Figure 9A:
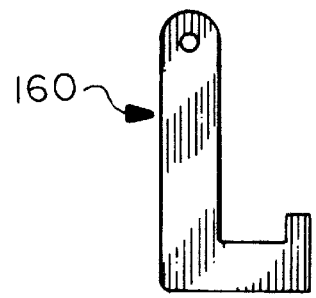
FIG. 9a is a side view of one of the hooks in the preferred angled plate form.
Figure 10:
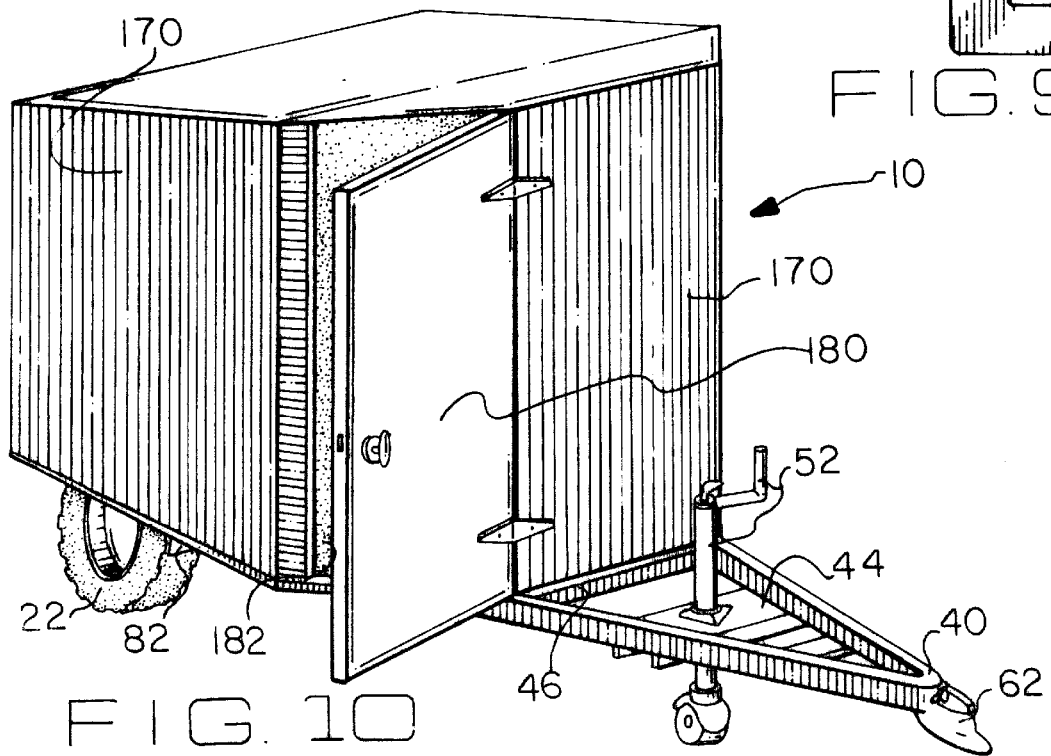
FIG. 10 is a perspective view of the trailer as in FIG. 1, but with a forward compartment door open.

Once bed 100 is raised to perimeter frame 20 level, it is locked at this level with any of various latching means. See FIGS. 9 and 9a. A series of hooks 160, which are preferably angled plates, are welded to and pivot with a rotating hook rod 162 mounted within brackets 164 anchored to each inner rail member 32, parallel to each side edge of bed 100, to swing underneath bed outer frame portion 102. Bed 100 is then lowered slightly to rest upon hooks 160. The weight of the bed 100 and motorcycle hold hooks 160 and hook rod 162 against rotation during towing.

Trailer 10 is preferably enclosed, so that from the outside it may somewhat resemble a horse trailer or U-Haul. A series of inverted U-shaped ribs 172 of the same general shape as brace member 98 but of greater width and height extend upwardly from the outer rail members 34 along the rail structures 26, and are welded to members 34. Ribs 172 are also fastened to beam 116. A sheet metal outer shell 170 is fastened in sections to the rib 172 outer surfaces, and across the forward-most and rearward-most ribs 172. See FIGS. 1 and 3. Outer shell 170 bends around ribs 172 to define forward, rearward, side and top shell 170 walls. A door opening 174 fitted with two hinged doors (not shown) is preferably provided in the rearward shell 170 wall. A plywood cover (not shown) is preferably provided over side structures 26 and over bed 100, which is in turn covered by an attractive material such as carpet.

Optional and preferred features include storage compartments 182 up front and having doors 180 opening out of the forward shell 170 wall of the shell 170. See FIG. 10. The forward shell 170 wall is arched forwardly to define additional trailer 10 interior space for compartments 182. A bunk (not shown) is preferably provided which is pivotally mounted to ribs 172 and pivots down from a shell 170 side wall so that the user can camp with trailer 10 in a remote location and perhaps take a dirt bike motorcycle out during the day. Tie-down bars 186 preferably extend along and are secured to each inner rail member 32 within trailer 10 for tying mounting straps (not shown) which lash a motorcycle in place during towing. A gate 190 is preferably pivotally connected to each vertical side leg of the inverted U-shaped brace member 98. See FIG. 7. The two gates 190 are pivoted downwardly into a horizontal position toward each other behind a loaded motorcycle as an added safety feature to keep the motorcycle from rolling out of trailer 10 during transport. A pulley axle crank retaining tube 192 is preferably welded in a vertical orientation onto the cross-beam 42 to receive and removably retain the crank handle 154 when not in use. An electric lighting system is preferably provided including a power source hook-up plug 194 or battery, lighting circuit wiring and lighting fixtures. A toilet (not shown) and an air conditioner (not shown) may also be added.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A trailer for transporting a cargo vehicle in tow behind a towing vehicle, comprising:

a perimeter frame comprising a frame perimeter structure with first and second frame perimeter structure side portions and having towing vehicle connection means, and comprising trailer supporting wheels, the plane of said frame perimeter structure being oriented substantially parallel with the ground when said vehicle connection means is connected to the towing vehicle;

a cargo vehicle support bed positioned substantially within said perimeter frame and having a bed outer frame structure with a bed forward end and a bed rearward end and a lateral bed first side region and a lateral bed second side region;

four pivoting interconnection slats, each said slat extending between said frame perimeter structure and said bed outer frame structure and being rotatably fastened at one slat end to said bed outer frame structure, a first said slat being rotatable fastened to said lateral bed first side region along said bed forward end and a second said slat being rotatable fastened to said lateral bed first side region along said bed rearward end, a third said slat being rotatably fastened to said lateral bed second side region along said bed forward end and a fourth said slat being rotatably fastened to said lateral bed second side region along said bed rearward end, and each said slat being rotatable fastened at the other slat end to an adjacent one of said first and second frame perimeter side portions;

such that said interconnection slats pivot downwardly when said bed is lowered and pivot upwardly when said bed is elevated;

and a line and pulley elevation mechanism for lowering said bed substantially perpendicular to the ground to load and unload said cargo vehicle and for elevating said bed substantially perpendicular to the ground for cargo vehicle transport, such that the plane of said bed always remains substantially parallel with the plane of said perimeter frame, said line and pulley elevation mechanism comprising a first pulley rotatable mounted to said frame perimeter structure first side portion and a first flexible line extending from said first pulley and being connected to said lateral bed first side region between the first said slat and the second said slat, and a second pulley rotatable mounted to said frame perimeter structure second side portion and a second flexible line extending from said second pulley and being connected to said lateral bed second side region between the third said slat and the fourth said slat, such that the weight of said bed and said cargo vehicle on said bed is substantially balanced forwardly and rearwardly of said first and second flexible lines for elevation of said bed and said cargo vehicle with minimal resistance.

2. The trailer of claim 1, wherein said cargo vehicle is a motorcycle.

3. The trailer of claim 1, wherein said line and pulley elevation mechanism comprises lines connected to said bed at points substantially lateral to the center of gravity of said bed when loaded with a cargo vehicle for bed balance during bed lowering and elevation.

4. The trailer of claim 1, wherein said frame perimeter structure comprises a forward cross structure and two parallel and spaced apart side rail structures integrally joined to and extending rearwardly from said forward cross structure.

5. The trailer of claim 4, additionally comprising:

a series of inverted U-shaped ribs of spanning and extending upwardly from said side rail structures;

a sheet metal outer shell fastened to said ribs;

and a door opening at the rearward portion of said shell fitted with at least one hinged door for passing said cargo vehicle during loading and unloading.

6. The trailer of claim 4, additionally comprising a tie-down bar extending along and secured to each said side rail structure within said trailer for tying mounting straps which lash said cargo vehicle in place during towing.

7. A trailer for transporting a cargo vehicle in tow behind a towing vehicle, comprising:

a perimeter frame comprising a frame perimeter structure having towing vehicle connection means, and comprising trailer supporting wheels, the plane of said frame perimeter structure being oriented substantially parallel with the ground when said vehicle connection means is connected to the towing vehicle;

a cargo vehicle support bed positioned substantially within said perimeter frame;

and a line and Pulley elevation mechanism for lowering said bed substantially perpendicular to the ground to load and unload said cargo vehicle and for elevating said bed substantially perpendicular to the ground for cargo vehicle transport, such that the plane of said bed always remains substantially parallel with the plane of said perimeter frame;

wherein said frame perimeter structure comprises a forward cross structure and two parallel and spaced apart side rail structures integrally joined to and extending rearwardly from said forward cross structure;

wherein each said side rail structure comprises substantially mutually parallel inner and outer rail members spaced laterally apart from each other and interconnected by at least one cross-strut.

8. The trailer of claim 7, wherein said cross structure comprises a cross-beam fastened substantially perpendicularly to the forward ends of both sets of said inner and outer rail members.

9. The trailer of claim 8, additionally comprising an A-shaped nose frame connected to and extending forwardly from said cross-beam, and comprising:

an A cross-link having a vertical opening and a conventional trailer jack extending through said vertical opening and fastened to said A cross-link;

and wherein said towing vehicle connection means comprises a conventional trailer hitch cup structure fastened to the forward-most portion of said A-shaped nose frame.

10. The trailer of claim 7, wherein said towing vehicle comprises towing vehicle tail and brake light circuitry, said trailer additionally comprising:

trailer tail and brake lights secured to the rear of said trailer, and trailer tail and brake light wiring extending forwardly from said trailer tail and brake lights and having an automobile wiring connection plug for connection to said towing vehicle tail and brake light circuitry.

11. The trailer of claim 7, wherein each said side rail structure comprises a trailer supporting wheel mounting structure.

12. The trailer of claim 11, wherein each said trailer supporting wheel mounting structure comprises:

a wheel mount pivot bolt fitted through bolt ports in and fastened between corresponding said inner and outer rail members;

two spaced apart wheel mount arms having arm pivot ends which pivotally engage said pivot bolt and extend downwardly and rearwardly to wheel mount arm ends;

a wheel axle extending between and through said arm wheel mount arm ends onto which at least one said trailer supporting wheel is mounted;

and spring means extending between said wheel axle and said frame perimeter structure for both dissipating and transmitting trailer supporting wheel ground impact energy to said frame perimeter structure.

13. The trailer of claim 12, additionally comprising a wheel fender fitted and fastened between said inner and outer rail members of each said side rail structure.

14. The trailer of claim 12, wherein each said trailer supporting wheel comprises a conventional trailer wheel rotatably mounted on said wheel axle and an inflated tire fitted around said trailer wheel.

15. The trailer of claim 12, wherein said spring means comprises a leaf spring having a leaf spring arch with a leaf spring middle portion and having leaf spring ends, said leaf spring being oriented such that said leaf spring arch opens upwardly from the ground and said spring middle portion is connected to said wheel axle and said leaf spring ends are pivotally joined to spring mounting means connected to said frame perimeter structure.

16. The trailer of claim 7, additionally comprising an inverted substantially U-shaped brace member structurally joined to the rearmost ends of said side rail structures for structurally interconnecting and holding said side rail structures substantially fixed relative to each other, said brace member being sized to readily pass said cargo vehicle when said bed is lowered during cargo vehicle loading and unloading.

17. The trailer of claim 16, wherein the lowermost ends of the U-shaped brace member are connected to the rearmost ends of each said outer rail member.

18. The trailer of claim 17, wherein said bed comprises:
a substantially rectangular bed outer frame portion;
a series of substantially parallel and laterally extending bed cross-members fastened within said outer frame portion.

19. The trailer of claim 18, additionally comprising:

a pivoting interconnection slat extending between and rotatably fastened at one slat end to a corresponding said inner rail member and at the other slat end to said bed outer frame portion;

such that said interconnection slat pivots downwardly when said bed is lowered and is sized to angle sharply relative to said bed outer frame portion when said bed is in a fully lowered position, and such that said bed makes only a slight longitudinal swing during bed lowering and elevating.

20. The trailer of claim 18, additionally comprising a motorcycle wheel guide channel including an upwardly opening U-shaped channel member laterally centered on top of said bed cross-members, extending from the front to the rear of said bed across said bed cross-members, and fastened to said bed.

21. The trailer of claim 7 wherein each said rail member has an interior side, and wherein said line and pulley elevation mechanism comprises:

a rail double pulley rotatably mounted to the interior side of each said inner rail member;

a bed double pulley rotatably mounted to said bed below each said rail double pulley;

flexible line interconnecting said rail and bed double pulleys on each side of said bed;

a forward pulley axle having pulley axle ends and a line gathering pulley at each said pulley axle end and extending over and being rotatably mounted in pulley axle brackets connected to and protruding upwardly from said forward cross structure, said forward pulley axle having axle rotation means;

such that each said line extends between each said pair of rail and bed double pulleys and then forwardly from each rail double pulley where it is gathered around a corresponding said line gathering pulley, and such that rotating said pulley axle with said axle rotation means in one rotational direction simultaneously gathers both said lines around the two corresponding said line gathering pulleys and thereby raises said bed, and rotating said pulley axle in the other rotational direction simultaneously unwinds both said lines from around the two said line gathering pulleys and thereby lowers said bed.

22. The trailer of claim 7, additionally comprising bed latching means for removably locking said bed in an elevated position.

23. The trailer of claim 22, wherein said bed latching means comprises:

a hook member fastened to a hook rod rotatably mounted within brackets extending from each said side rail structure, to swing underneath said bed outer frame portion, such that said bed can be lowered to rest upon the hooks and the weight of said bed holds said hook members and hook rod against rotation.

24. The trailer of claim 16, additionally comprising a gate pivotally connected to each vertical side of said inverted U-shaped brace member, for pivoting downwardly into a substantially level position behind a loaded said cargo vehicle for keeping said cargo vehicle from rolling out of said trailer during towing.

25. A trailer for transporting a cargo vehicle in tow behind a towing vehicle, comprising:

a perimeter frame comprising a frame perimeter structure having towing vehicle connection means, and comprising trailer supporting wheels and comprising a forward cross structure and two parallel and spaced apart side rail structures integrally joined to and extending rearwardly from said forward cross structure, the plane of said frame perimeter structure being oriented substantially parallel with the ground when said vehicle connection means is connected to the towing vehicle, each said side rail structure comprising substantially mutually parallel inner and outer rail members spaced laterally apart from each other and interconnected by cross-struts;

each said side rail structure further comprising trailer supporting wheel mounting structure having a wheel mount pivot bolt fitted through bolt ports in and fastened between corresponding said inner and outer rail members; a wheel mount arm having an arm pivot end which pivotally engages said pivot bolt and extends downwardly and rearwardly to a wheel mount arm end; a wheel axle extending through said arm wheel mount arm end onto which at least one said trailer supporting wheel is mounted; and spring means extending between said wheel axle and said frame perimeter structure for both dissipating and transmitting trailer supporting wheel ground impact energy to said frame perimeter structure.

* * * * *